US011866915B2

(12) United States Patent
Leigh et al.

(10) Patent No.: US 11,866,915 B2
(45) Date of Patent: Jan. 9, 2024

(54) LIQUID CONCENTRATE DOSING SYSTEMS

(71) Applicant: Rheem Manufacturing Company, Atlanta, GA (US)

(72) Inventors: Taylor Leigh, Alpharetta, GA (US); Jason Lye, Atlanta, GA (US); Atilhan Manay, Montgomery, AL (US); Stephen Phelps, Lilburn, GA (US); Troy Trant, Montgomery, AL (US); Jon Thomas, Atlanta, GA (US); Prudhvi Amaravadhi, Montgomery, AL (US); Edward Holman, Atlanta, GA (US); Fahira Sangare, Atlanta, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 547 days.

(21) Appl. No.: 17/113,173

(22) Filed: Dec. 7, 2020

(65) Prior Publication Data
US 2022/0178117 A1  Jun. 9, 2022

(51) Int. Cl.
E03B 7/07 (2006.01)
(52) U.S. Cl.
CPC .............. *E03B 7/074* (2013.01); *E03B 7/072* (2013.01); *E03B 7/075* (2013.01)
(58) Field of Classification Search
CPC .......... E03B 7/074; E03B 7/072; E03B 7/075; C02F 2201/005; C02F 2209/40; C02F 2303/22; C02F 1/686; C02F 5/086
See application file for complete search history.

(56) References Cited

U.S. PATENT DOCUMENTS 3,574,883 A    4/1971  Brittain
4,178,138 A   12/1979  Iles
(Continued)

FOREIGN PATENT DOCUMENTS

CN         1451470      * 10/2003
CN      101578238 B       1/2013
(Continued)

OTHER PUBLICATIONS

International Search Report and Written Opinion for PCT Application No. PCT/US2021/061705 dated Mar. 17, 2022.
(Continued)

*Primary Examiner* — Bob Zadeh
(74) *Attorney, Agent, or Firm* — Eversheds Sutherland (US) LLP

(57) ABSTRACT

A liquid dosing system is disclosed and can include a cartridge comprising a reservoir configured to store an additive, an output vessel in fluid communication with the reservoir, and a cartridge outlet in fluid communication with the output vessel. The liquid dosing system can include a housing that includes a water passage configured to direct water though the liquid dosing system and a receiving portion configured to at least partially receive the cartridge when the cartridge is connected to the housing. The receiving portion can include a receiving port in fluid communication with the water passage, and the receiving port can be configured to receive at least some of the additive from the cartridge outlet when the cartridge is connected to the housing. The receiving portion can include a motor configured to engage in mechanical communication with the output vessel when the cartridge is connected to the housing.

19 Claims, 8 Drawing Sheets

(56) References Cited

U.S. PATENT DOCUMENTS

| | | | |
|---|---|---|---|
| 4,886,431 A | 12/1989 | Soderquist et al. | |
| 5,657,000 A | 8/1997 | Ellingboe | |
| 5,711,654 A | 1/1998 | Afflerbaugh | |
| 5,984,889 A | 11/1999 | Christ et al. | |
| 10,507,134 B2 | 12/2019 | Charles | |
| 2004/0092873 A1* | 5/2004 | Moberg | A61M 39/12 604/126 |
| 2004/0167480 A1 | 8/2004 | Bos | |
| 2004/0228735 A1 | 11/2004 | Byrne | |
| 2006/0216212 A1 | 9/2006 | Lum et al. | |
| 2006/0216217 A1 | 9/2006 | Chan et al. | |
| 2006/0245964 A1 | 11/2006 | Koslov | |
| 2007/0060915 A1 | 3/2007 | Kucklick | |
| 2007/0240649 A1 | 10/2007 | Freeman | |
| 2007/0253850 A1 | 11/2007 | Williams | |
| 2007/0270735 A1 | 11/2007 | Williams et al. | |
| 2008/0029541 A1* | 2/2008 | Wallace | B67D 1/0021 222/207 |
| 2008/0051698 A1 | 2/2008 | Mounce et al. | |
| 2008/0051709 A1 | 2/2008 | Mounce et al. | |
| 2008/0147023 A1 | 6/2008 | Hopkins et al. | |
| 2008/0154183 A1 | 6/2008 | Baker et al. | |
| 2008/0173705 A1* | 7/2008 | Girard | B67D 1/0031 222/64 |
| 2016/0287779 A1 | 10/2016 | Orczy-Timko et al. | |
| 2017/0354234 A1 | 12/2017 | Streeter et al. | |
| 2018/0171996 A1 | 6/2018 | Cheung et al. | |
| 2018/0186656 A1 | 6/2018 | Drewniak et al. | |
| 2020/0049342 A1* | 2/2020 | Nowak | C02F 1/50 |
| 2020/0132066 A1 | 4/2020 | Buskirk et al. | |
| 2020/0277719 A1 | 9/2020 | Driussi | |
| 2021/0229975 A1 | 7/2021 | Mazzola et al. | |
| 2021/0332407 A1* | 10/2021 | Jauss | C12Q 1/04 |

FOREIGN PATENT DOCUMENTS

| | | | |
|---|---|---|---|
| DE | 102017114665 A1 * | 1/2019 | |
| EP | 0026704 A1 | 4/1981 | |
| EP | 1145767 A2 | 10/2001 | |
| EP | 2296520 B1 | 9/2018 | |
| EP | 2625017 B1 | 9/2018 | |
| GB | 2385291 * | 8/2003 | |
| JP | 2007198382 A | 8/2007 | |
| JP | 2014200696 * | 10/2014 | |
| SU | 1255740 A1 | 9/1986 | |
| WO | 2009047000 A1 | 4/2009 | |

OTHER PUBLICATIONS

International Search Report and Written Opinion of PCT Application No. PCT/US2021/061710 dated Apr. 7, 2022 (8 pages).

* cited by examiner

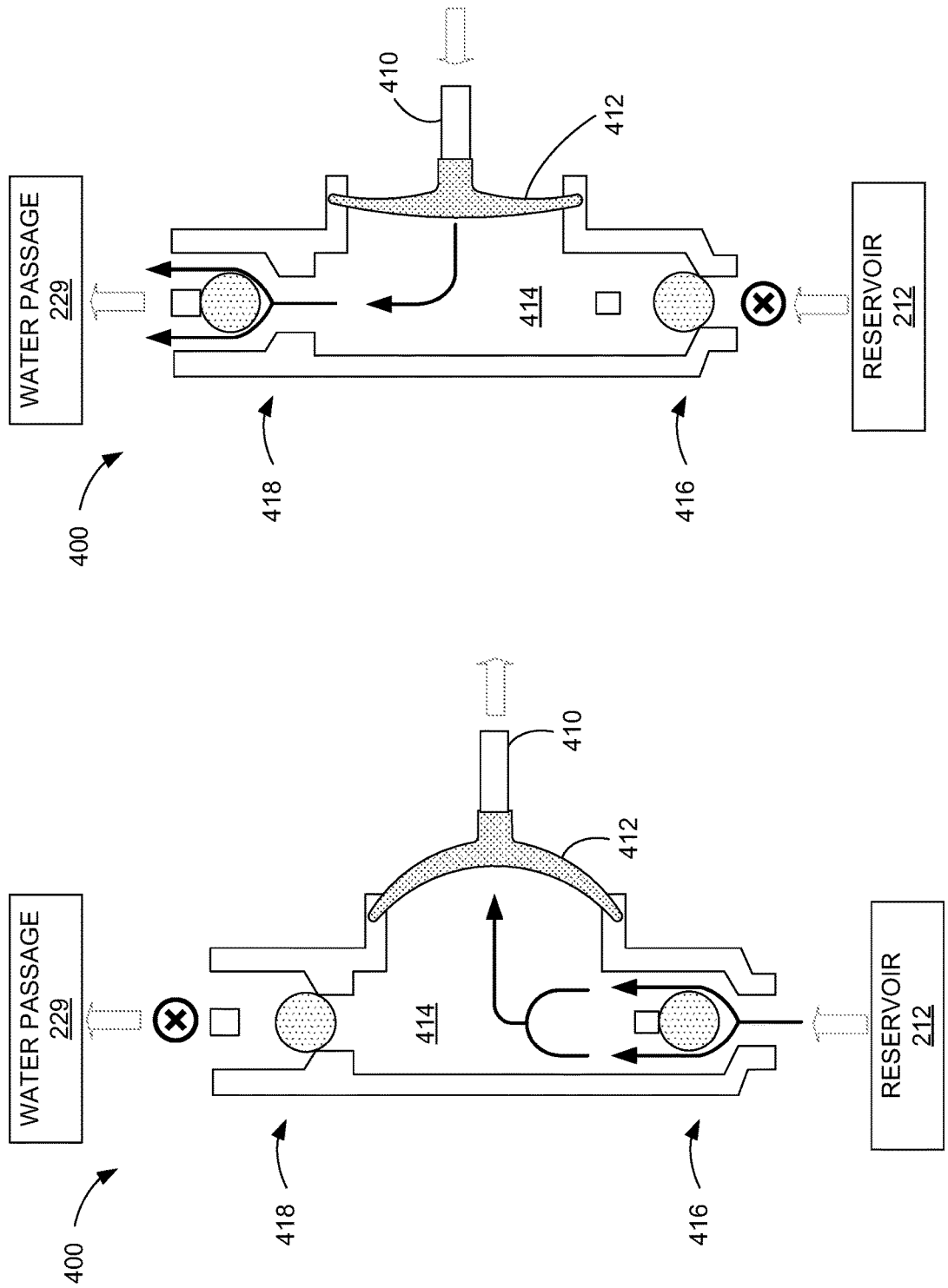

LIQUID CONCENTRATE DOSING SYSTEMS

BACKGROUND

Water hardness refers to the presence of minerals in water, namely calcium, magnesium, iron, and other trace minerals. Water hardness can reduce the efficacy of detergents, cause soap scum buildup in sinks and bathtubs, and result in mineral deposits or spotting on surfaces such as mirrors, tile, and glass that are splashed by the mineral laden water. Water hardness may be designated either permanent or temporary. Permanent water hardness is typically caused by water soluble mineral salts, such as calcium chloride, magnesium sulfate, or iron chloride. Generally, permanent water hardness will not foul heat exchangers and is not impacted by boiling. Permanent hardness can, however, interfere with the action of soaps and detergents and can cause soap scum fouling, water spotting, and/or increased use of soap and cleaners to compensate.

Temporary hardness, on the other hand, can cause problematic limescale fouling on surfaces in contact with the water. Temporary water hardness relates to the presence of minerals, such as calcium, magnesium, iron, and other trace minerals dissolved in the hydrogen carbonate form. Calcium and magnesium hydrogen carbonate are not thermally stable and can decompose into the corresponding carbonate, water, and carbon dioxide upon heating or slowly over time with the evolution of carbon dioxide at room temperature. Because calcium and magnesium carbonates are less soluble in water, they can precipitate as limescale. Some of this limescale can deposit on immersed surfaces, especially heated surfaces. The limescale can build up over time on heat exchanger surfaces, which can eventually result in negative effects. For example, limescale buildup can reduce thermal efficiency, cause overheating of metal parts, reduce water flow, and/or increase use of fuel and or power to heat the water to the desired temperature.

Tankless water heaters (also referenced as instantaneous water heaters) have become widely adopted for their provision of a readily available, continuous flow of hot water and potential energy savings as compared to conventional tank water heaters. Unfortunately, tankless water heaters are more sensitive to the deposition of limescale within the heat exchanger, limiting utility in areas of high water hardness. In particular, the buildup of scale can negatively impact the efficiency of tankless water heaters and can reduce water flow, which can reduce some of the benefits of tankless water heaters.

Efforts have been undertaken to slow or stop limescale buildup in tankless water heaters and other water heating systems by softening the water. For example, temporary hardness can be reduced simply by boiling the water, and allowing the limescale to settle. Other methods exist for removing the calcium and magnesium salts from the water and replacing them with other cations, such as is done using ion-exchange resins. Either the calcium or the hydrogen carbonate can be exchanged for a different counterion, or both ions can be exchanged for hydrogen and hydroxyl ions to make de-ionized water. Other water softening methods include reverse osmosis and distillation.

Other methods may involve treating the water such that the calcium and magnesium stay in the water solution, even after boiling. Some basic approaches in this regard include: (a) complexing the calcium and magnesium ions with a chelating agent, such as ethylenediaminetetraacetic acid (EDTA) so that they remain in solution; (b) treating the water with a mild acid to form water soluble calcium and magnesium salts, such as ethanoic or citric acid; or (c) treating the calcium and magnesium ions with a threshold treatment that prevents limescale formation, such as certain types of phosphates and silicates. For example, the water can be treated with small amounts of sodium hexametaphosphate and/or sodium polyphosphate and/or sodium tetrametaphosphate, and/or sodium silicate to prevent limescale formation. While sodium is a common group I cation, other cations associated with various phosphate anions can be used alternatively or in addition. For instance, the sodium +1 cation could be partially or completely replaced by potassium, or ammonium cations. Other threshold treatments may include co-polymeric and polyanionic surfactants, such as poly(acrylic acid-styrene-butyl acrylate) block copolymers as a non-limiting example.

Further, systems exist for passively adding sodium hexametaphosphate or another additive to water using the force of the flow of the water. For example, the additive can be added to the flow of water via a venturi or by diffusion. However, such methods often overdose phosphate or underdose the additive. To that end, these passive addition methods can be sensitive to changes in water flow rate and supply water pressure. That is, changes in water flow rate and/or supply water pressure can cause the system to overdose or underdose the additive. As will be appreciated, domestic water pressure can vary depending on, for example, the local altitude, the municipality, and the setting of the pressure regulator at the associated water main.

Underdosing can result in an insufficient amount of additive in the water to prevent scaling, which thus reduces the efficacy and usefulness of the system. For example, once a few gallons of water has flowed past most passive systems, the concentration of added phosphates can drop to the extent that the water coming out of the cartridge is almost indistinguishable from the water entering the cartridge.

Overdosing can result in concentrations of additive that are too high to comply with controlling regulations, for example. If a passive additive system fitted to the water supply is left full of water for an extended duration, excess phosphate can diffuse out of the cartridge and form a high concentration "slug" or mass of additive material in the water that is flowed into the water heater system the next time water is used. In summary, passive systems seem to be constantly in an overdosing or underdosing situation. Thus, there are several difficulties and shortcomings that prevent efficient and effective addition of scale-preventing additives to water.

SUMMARY

These and other problems are addressed by the technologies described herein. Examples of the present disclosure relate generally to systems and devices for dosing water with an additive.

The disclosed technology includes a liquid dosing system for providing an additive to water or another liquid. The liquid dosing system can include a cartridge and a housing. The cartridge can include a reservoir configured to store the additive, an additive output vessel in fluid communication with the reservoir, and a cartridge outlet in fluid communication with the additive output vessel. The housing can include a water passage in fluid communication with an inlet of the housing and an outlet of the housing, and the housing can include a receiving portion configured to at least partially receive the cartridge when the cartridge is connected to the housing. The receiving portion can include a receiving port in fluid communication with the water passage, and the receiving port can be configured to receive at least some of the additive from the cartridge outlet when the cartridge is connected to the housing. The receiving portion can include a motor configured to engage in mechanical communication with the additive output vessel when the cartridge is connected to the housing.

The additive output vessel can be a flexible tube.

The housing can further include a peristaltic pump, and the peristaltic pump can include the motor and a rotor system in mechanical communication with the motor. The rotor system can be configured to at least partially impinge the flexible tube when the cartridge is connected to the housing.

The reservoir can be or include the additive output vessel, and the cartridge can further include a screw and a plunger. The plunger can be disposed within the reservoir, the plunger can be connected to the screw, and/or the plunger can be configured to move laterally within the reservoir when the screw turns.

The screw can be configured to mechanically communicate with the motor when the cartridge is connected to the housing.

The motor can include at least one of a stepper motor, a continuous motor with a gear reducer, and a variable frequency drive direct drive motor.

The cartridge can further include a check valve configured to permit the additive to flow out of the cartridge and to prevent fluids from flowing into the cartridge.

The liquid dosing system can further include a latching system configured to detachably attach the cartridge the housing.

The housing can further include a flow meter configured to measure flow rates and output flow rate data indicative of the flow rates, and the housing can further include a controller in electrical communication with the flow meter and the motor. The controller can be configured to receive flow rate data from the flow meter, and output, based at least in part on the flow rate data, instructions for the motor to output a predetermined amount of the additive for mixing with water flowing through the water passage.

The controller can be configured to output the instructions for the motor in response to determining, based on the flow rate data, that the water has stopped flowing through the water passage.

The controller can be configured to output the instructions for the motor in response to determining, based on the flow rate data, that a flow rate the water flowing through the water passage is less than a predetermined flow rate threshold.

The additive can include at least one of sodium hexametaphosphate and sodium polyphosphate.

The predetermined amount of the additive can correspond to between approximately 1 part per million (ppm) and approximately 10 ppm of the additive in the water. The predetermined amount of the additive can correspond to between approximately 3 ppm and approximately 7 ppm of the additive in the water. The predetermined amount of the additive can correspond to approximately 5 ppm of the additive in the water.

The predetermined amount of the additive can correspond to between approximately 0.020 mL and approximately 0.040 mL of additive per gallon of water flowing through the water passage.

At least one of the cartridge and the housing can include a user interface in electrical communication with the controller, and the user interface can be configured to indicate a status of the cartridge.

The additive can be used in the form of a highly concentrated aqueous solution Such as 100 g·dm$^{-3}$ to 800 g·dm$^{-3}$ sodium hexametaphosphate, for example. The additive can be contained within the cartridge or within a container that is separate from the cartridge. Alternatively or in addition, the additive can be contained within a flexible pouch that is included within the cartridge.

The disclosed technology includes a liquid dosing system that can include a cartridge and a housing. The cartridge can include a reservoir configured to store an additive, a pump cavity in fluid communication with the reservoir, a cartridge outlet in fluid communication with the pump cavity, and a diaphragm membrane attached to at least a portion of the pump cavity. The housing can include a water passage in fluid communication with an inlet of the housing and an outlet of the housing, and the housing can include a receiving portion configured to at least partially receive the cartridge when the cartridge is connected to the housing. The receiving portion can include a receiving port in fluid communication with the water passage, and the receiving port can be configured to receive at least some of the additive from the cartridge outlet when the cartridge is connected to the housing. The receiving portion can include a motor configured to engage in mechanical communication with the diaphragm membrane when the cartridge is connected to the housing.

The diaphragm membrane can be elastic.

The liquid dosing system can further include a first one-way valve and a second one-way valve. The first one-way valve can be located downstream of the reservoir and upstream of the pump cavity, and the first one-way valve can be configured to permit the additive to flow out of the reservoir and to prevent fluids from flowing into the reservoir. The second one-way valve can be located downstream of the pump cavity and upstream of the water passage, and the second one-way valve can be configured to permit the additive to flow out of the pump cavity and to prevent fluids from flowing into the pump cavity.

The cartridge can be detachably attachable to the housing.

The liquid dosing system can further include a latching system configured to detachably attach the cartridge the housing.

The disclosed technology also includes methods for operating liquid dosing systems as described more fully herein, as well as non-transitory, computer readable mediums storing instructions for performing one or more such methods.

Further features of the disclosed design, and the advantages offered thereby, are explained in greater detail hereinafter with reference to specific examples illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into, and constitute a portion of, this disclosure, illustrate various implementations and aspects of the disclosed technology and, together with the description, serve to explain the principles of the disclosed technology. In the drawings:

FIGS. 4A and 4B illustrate an example diaphragm pump of an example dosing system, in accordance with the disclosed technology;

DETAILED DESCRIPTION

Figure 1:
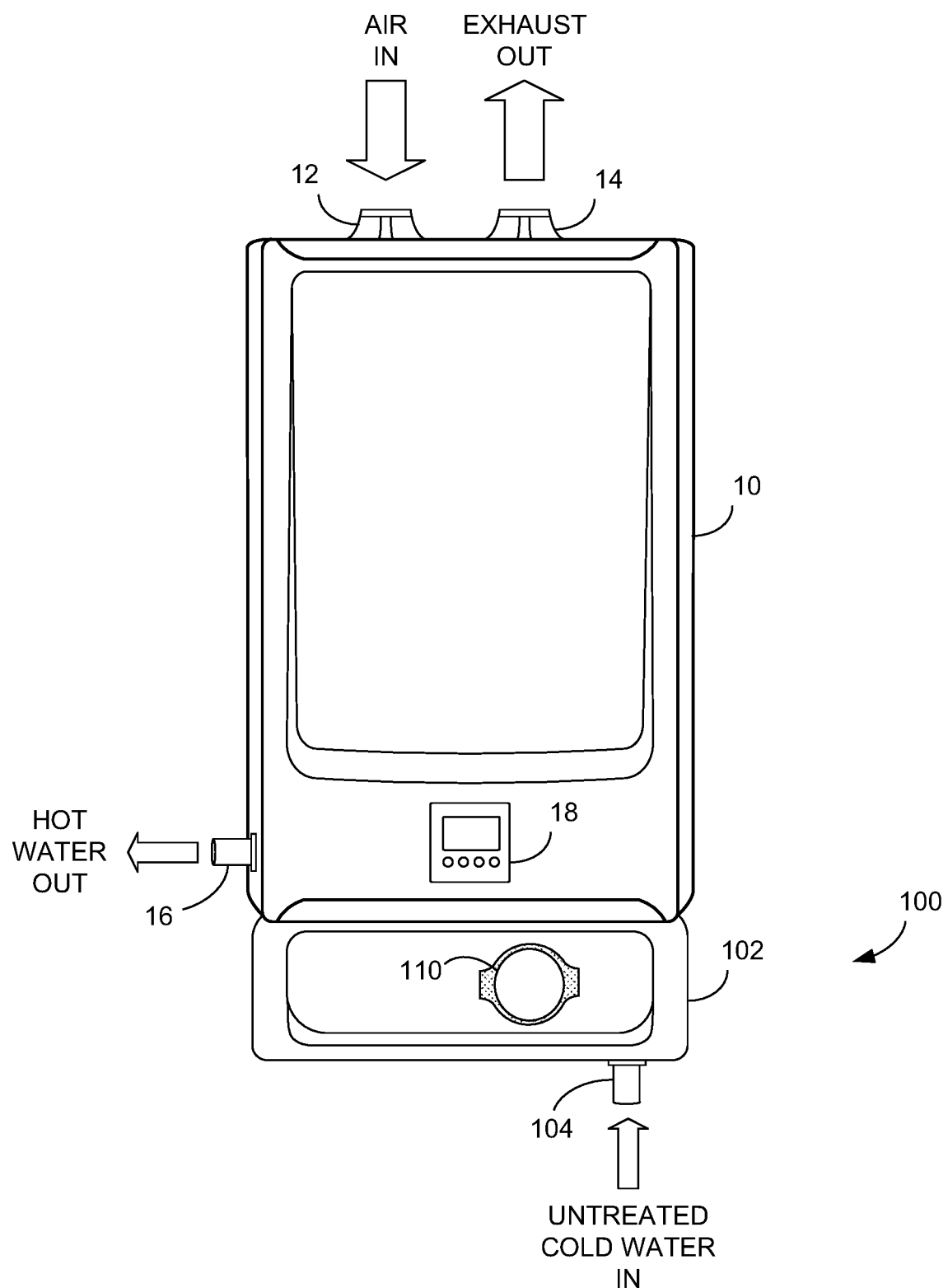
FIG. 1 illustrates an example dosing system attached to a tankless water heater, in accordance with the disclosed technology.

The disclosed technology relates generally to systems and devices for dosing water with an additive to prevent scaling caused by temporary water hardness in a water heating device. However, the disclosed technology is not so limited. Indeed, the disclosed technology can be used in any system or process in which an additive or other material is added or otherwise introduced. For example, the disclosed technology can be useful in the addition of one or more detergents to a cleaning device (e.g., delivery of concentrated or unconcentrated detergent doses to a clothes washer, delivery of concentrated or unconcentrated detergent doses to a dishwasher); chemical dosing for a pool, hot tub, or spa; delivery of additives (e.g., cream, flavors) to a coffee drink machine; delivery of concentrated or unconcentrated syrup to a soda machine; water treatment for an aquarium, dispensing of soap or hand sanitizer; lubrication of an engine; nutrient dosing to water for farming and agriculture; nutrient dosing for a hydroponic or aeroponic agricultural system; micro-dosing of preservatives and rinsing fluids for harvest wash solutions (e.g., washing and/or preserving fruits or vegetables); medical dosing (e.g., drug delivery, wound lavage solution); dispensing cleaning additives for cleaning and/or disinfecting of supplies and equipment (e.g., in a medical facility). This list of uses is non-exhaustive, and other uses will be apparent to those having skill in the art. Regardless of the particular application, the disclosed technology can dispense small and precise quantities of an additive or other material from a replaceable cartridge, as described more fully herein.

Some examples of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout this disclosure, various aspects of the disclosed technology can be presented in a range format (e.g., a range of values). It should be understood that such descriptions are merely for convenience and brevity and should not be construed as an inflexible limitation on the scope of the disclosed technology. Accordingly, the description of a range should be considered to have specifically disclosed all the possible subranges as well as individual rational numerical values within that range. For example, a range described as being "from 1 to 6" includes the values 1, 6, and all values therebetween. Likewise, a range described as being "between 1 and 6" includes the values 1, 6, and all values therebetween. The same premise applies to any other language describing a range of values. That is to say, the ranges disclosed herein are inclusive of the respective endpoints, unless otherwise indicated.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although the disclosed technology may be described herein with respect to various systems and methods, it is contemplated that embodiments or implementations of the disclosed technology with identical or substantially similar features may alternatively be implemented as methods or systems. For example, any aspects, elements, features, or the like described herein with respect to a method can be equally attributable to a system. As another example, any aspects, elements, features, or the like described herein with respect to a system can be equally attributable to a method.

Reference will now be made in detail to example embodiments of the disclosed technology, examples of which are illustrated in the accompanying drawings and disclosed herein. Wherever convenient, the same reference numbers will be used throughout the drawings to refer to the same or like parts.

Referring to FIG. 1, an example tankless water heater 10 is illustrated. The water heater 10 can be configured to heat water using electrical heating elements or combustion using, for example, natural gas for fuel. A combustion-type water heater 10 is illustrated in FIG. 1, and as such, the water heater 10 can include an air inlet 12 and an exhaust outlet 14. The water heater can be configured to receive gas or another fuel via a fuel inlet (not shown). Alternatively or additionally, the water heater 10 can be configured to receive electrical power via one or more electrical contacts, an electrical cord, or the like. The water heater 10 can also be configured to receive water at a water inlet (not shown) and output heated water at a hot water outlet 16. Optionally, the water heater 10 can include a user interface 18, which can display information and/or receive inputs from a user. Although the water heater 10 is illustrated as being a tankless water heater, it is contemplated that the disclosed technology can be used with any type of water heater, including a tankless water heater, a storage tank water heater, an electric water heater, a combustion water heater, and a heat pump water heater, as non-exhaustive examples.

A dosing system 100 can be fluidly connected to the water inlet of the water heater 10, and the dosing system 100 can include a water inlet 104 configured to receive water from a water source. The dosing system 100 can include a housing 102 and a cartridge 110 that includes one or more additives for treating water. The additives can used, for example, to treat water hardness. For example, the water can be treated with sodium hexametaphosphate and/or sodium polyphosphate to prevent limescale formation. Generally, regardless of the level of water hardness, adding around 4 parts per million (mg per liter) of sodium hexametaphosphate (also known as "Graham's Salt") to hard water prevents limescale formation; in this regard, the addition of sodium hexametaphosphate can be referred to as a threshold treatment. While the water can still test as hard using a hardness test (because the water still contains calcium and magnesium ions), limescale will not form. While sodium is a common group I cation, other cations associated with various phosphate anions can be used alternatively or in addition. For instance, the sodium +1 cation could be partially or completely replaced by potassium, or ammonium cations. Other treatments that can prevent limescale formation include sodium silicate, the use of neutralized poly(acrylic acid) and acrylate co-polymers, citric acid, hydrochloric acid, acetic acid.

The cartridge 110 can be integral with the housing 102. Alternatively, the cartridge 110 can be detachably attachable to the housing 102. For example, the cartridge 110 can be removed from the housing 102 and refilled with an additive and/or replaced with a new cartridge 110. As another example, the cartridge 110 can be removed from the housing 102 for repair or replacement of one or more components of the cartridge 110, as described more fully herein.

Although the dosing system 100 is illustrated as being separate from the water heater 10, it is contemplated that the dosing system can be integrated into the water heater 10. For example, the water heater 10 can include some or all of the components described herein (e.g., at least some of the components described as being included in the housing 102 of the dosing system 100). Thus, the water heater 10 can be configured to receive at least a portion of a cartridge 110 such that incoming water can be treated prior to being heated by the water heater 10.

Figure 2A:
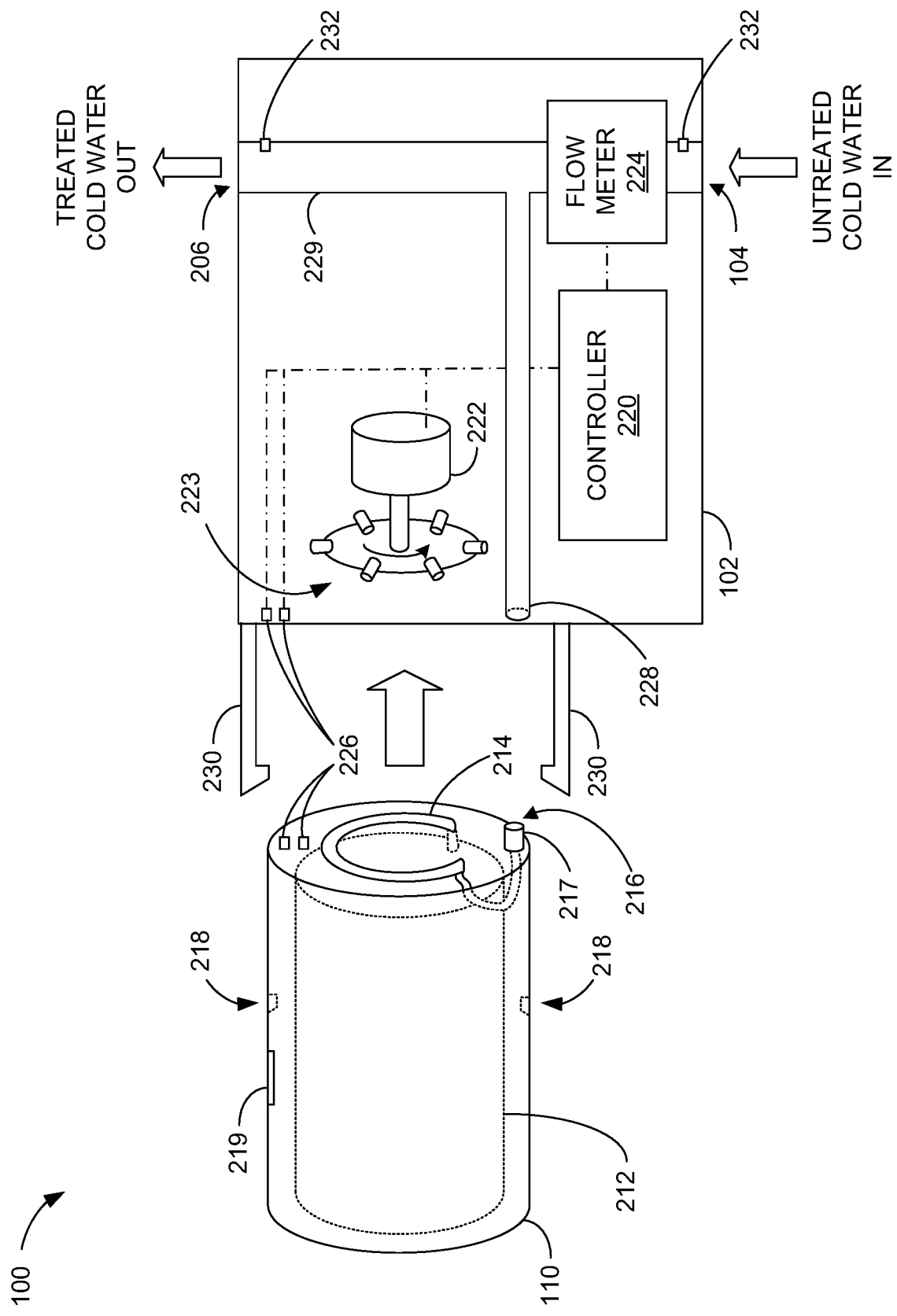
FIGS. 2A and 2B illustrate schematic views of an example dosing system, in accordance with the disclosed technology.
Figure 2B:
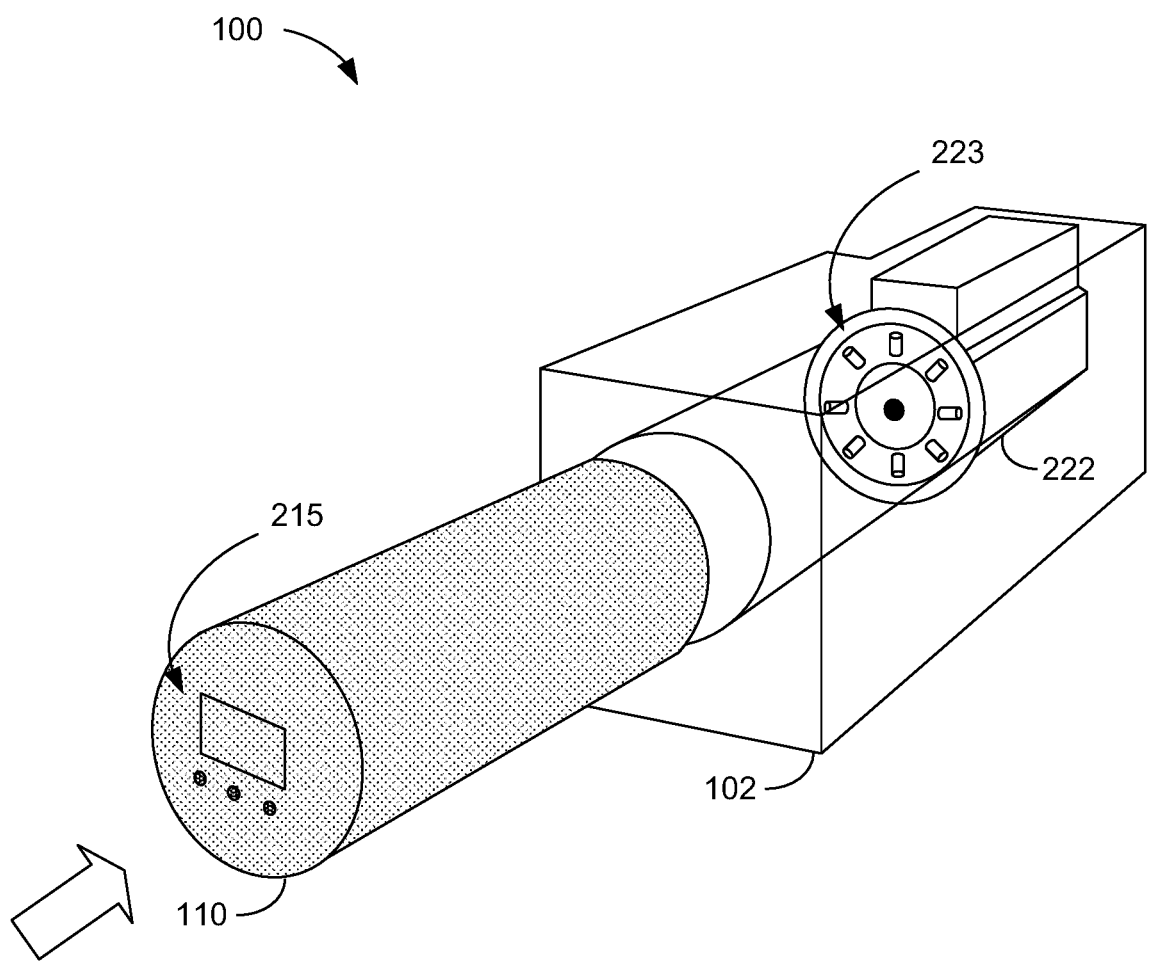

Referring to FIGS. 2A and 2B, the housing 102 can include an outlet 206 in fluid communication with the inlet 104. The outlet 206 can be configured to connect to the inlet of the water heater 10, such that treated water can be provided to the water heater 10, thereby preventing scaling in the water heater 10. The housing 102 can include a controller 220 and a motor 222. The motor 222 can be or can include, for example, a stepper motor. As additional non-limiting examples, the motor 222 can be or can include a continuous motor (e.g., with a gear reducer) or a direct drive motor (e.g., controlled using a variable frequency drive). The controller 220 can include a processor and memory storing instructions that, when executed by the processor, cause the controller 220 to perform certain actions, such as controlling the motor 222. The housing 102 can include a flow meter 224 configured to detect a flow rate of water passing through the housing 102 and configured to transmit flow rate data indicative of the water's flow rate. The controller 220 can be configured to receive the flow rate data. Optionally, the controller 220 can be configured to communicate with a controller of the water heater 10. Alternatively or in addition, the dosing system 100 can be controlled by the controller of the water heater 10 (i.e., the water heater's 10 controller can act as the controller 220). As discussed more fully herein, the controller 220 can be configured to control the motor 222 to output a particular amount of additive from the cartridge 110 based at least in part on the flow rate data.

The cartridge can be made of any desirable material, such as metals, plastics, and the like. For example, the cartridge 110 can be made of aluminum, high-density polyethylene (HDPE), acrylonitrile butadiene styrene (ABS), polystyrene, or the like, or any combination thereof.

The cartridge 110 can include a reservoir 212 configured to store an amount of additive. The reservoir 212 can be in fluid communication with a flexible tube 214 (e.g., if the housing 102 includes a peristaltic pump system, as described more fully herein). The flexible tube 214 can be located on or near a face of the cartridge 110. The flexible tube 214 can be in fluid communication with an outlet 216 of the cartridge, and a check valve 217 can be located at or near the outlet 216. The check valve 217 can ensure the additive flows in a single direction. That is, the check valve 217 can ensure that the additive can flow out of the cartridge 110, while prevent water and/or the additive from flowing back into the cartridge 110. The cartridge can also include one or more detents 218 or other attachment mechanisms, as will be described more fully herein. The housing can include one or more latches 230 configured to connect to the detents 218 of the cartridge 110, thereby retaining the cartridge in mechanical and fluid communication with the housing 102. The cartridge 110 can include a vent 219, which can help release any vacuum formed by the pumping of additive into the water stream from the reservoir 212 to ensure the additive can freely exit the cartridge 110.

The reservoir 212 can be configured to store a concentrated solution of additive (e.g., 700 g·dm$^{-3}$ sodium hexametaphosphate), which can a sufficiently high concentration such that the volume of the reservoir 212 and the overall cartridge 110 is reduced or minimized. For example, the reservoir 212 can have an internal volume between approximately 80 cubic inches and approximately 110 cubic inches. As a more specific example, the reservoir's 212 internal volume can be approximately 95 cubic inches. Alternatively or in addition, the reservoir 212 can be of sufficient volume to provide the additive for at least a year. For example the reservoir 212 can be configured to hold between approximately 700 mL and approximately 900 mL of sodium hexametaphosphate (e.g., assuming a daily usage of approximately 84 gallons of hot water for one year, a cartridge having between approximately 700 mL and approximately 900 mL of a 700 g·dm$^{-3}$ sodium hexametaphosphate solution would be sufficient to dose the water to 5 ppm).

As shown in FIG. 2A, the cartridge 110 can be configured to attach to a substantially outer portion of the housing 102. Alternatively, as shown in FIG. 2B, the cartridge 110 and the housing 102 can be configured such that at least a portion of the cartridge can insert into an aperture of the housing 102. Regardless, the cartridge, when attached to the housing 102, can be in mechanical and fluid communication with the housing 102.

Optionally, the cartridge 110 and the housing 102 can each include one or more electrical contacts 226. The electrical contact(s) 226 of the cartridge 110 can be configured to abut the respective electrical contact(s) 226 of the housing 102 when the cartridge is fully inserted into, or otherwise attached to, the housing 102. The electrical contact(s) 226 of the housing 102 can be in electrical communication with the controller 220. Accordingly, the controller 220 can be configured to first ensure the cartridge 110 is properly connected to the housing 102 before activating the motor 222 and/or dosing component of the dosing system 100.

Alternatively or in addition, the electrical connections can have other uses. For instance, the electrical connections (e.g., between the electrical contacts 226 of the cartridge 110 and the housing 102) can help provide electricity to a display (e.g., a display, one or more LED lights) to indicate whether the cartridge's 110 supply of additive is depleted and/or whether the cartridge 110 correctly or incorrectly inserted. For example, the electrical contacts 226 can enable the controller 220 to communicate with a chip and/or logic circuits on the cartridge 110 to enable to controller to determine (or receive data indicating) whether the cartridge's 110 supply of additive is depleted and/or whether the cartridge 110 correctly or incorrectly inserted. As another example, the chip can include a unique unit number for the cartridge 110, which can be transmitted to, and stored by, the controller 220, and/or the storage level of additive can be stored on the chip (e.g., by the chip or by the controller 220), which can be advantageous if the system loses power or the cartridge is removed. This can enable a technician or use to remove a cartridge 110 while troubleshooting any issues and, during the process, inserts a new cartridge 110 or re-inserts the original cartridge 110. Alternatively or in addition, the electrical connection can be used to power audible signals (e.g., to indicate whether the cartridge's 110 supply of additive is depleted and/or whether the cartridge 110 correctly or incorrectly inserted). Alternatively or additionally, the electrical contacts 226 can enable the controller 220 to ensure the inserted cartridge 110 is an original equipment part and not an aftermarket cartridge (e.g., based on data received from the cartridge's 110 on-board chip.

The motor 222 can include (or be a part of) any useful device or component for delivering or otherwise outputting precise doses of small amounts of additive, which can be a liquid additive. For example, the motor 222 can include or be a part of a device configured to deliver between approximately 0.020 mL and approximately 0.040 mL of additive per gallon of water flowing through the dosing system 100. Alternatively or in addition, the motor 222 can include or be a part of a device configured to deliver between approximately 1 and approximately 10 ppm of sodium hexametaphosphate. Alternatively or in addition, the motor 222 can include or be a part of a device configured to deliver between approximately 3 and approximately 7 ppm of sodium hexametaphosphate. As a more specific example, the motor 222 can include or be a part of a device configured to deliver approximately 0.027 mL of 700 g·dm$^{-3}$ sodium hexametaphosphate per U.S. gallon of cold water flowing through the dosing system. This will result in approximately 5 parts per million (ppm) of sodium hexametaphosphate, which is well below the NSF/ANSI 60 (2016) requirement that concentrations of sodium hexametaphosphate be below 11 ppm for drinking water, yet above the threshold treatment level to effectively prevent limescale deposition in the water heater.

The motor 222 can be a part of or be in communication with a peristaltic pump system, a syringe pump system, a diaphragm pump system, a screw dosing system, or the like. An example peristaltic pump system is illustrated in FIGS. 2A and 2B. The motor 222 can be in mechanical communication with a rotor system 223, which can include a plurality of rotors. When the cartridge 110 is connected to the housing 102, the rotors can abut the flexible tube 214, and as the motor 222 rotates the rotors of the rotor system 223, the rotors can press against the flexible tube 214, squeezing the flexible tube 214, and pushing the additive along the length of the flexible tube 214 as the rotor system 223 rotates. In such a manner, precise amounts of the additive can be forced through the flexible tube 214 and out of the cartridge 110 via the outlet 216 and/or check valve 217. When the cartridge 110 is connected to the housing 102, the outlet 216 and/or check valve 217 can be in fluid communication with a receiving port 228 of the housing 102. The receiving port 228 can be in fluid communication with a water passage 229 through which water can flow from the inlet 104 to the outlet 206. Thus, the dosing system 100 can dispense a precise amount of additive from the cartridge 110 and to the water flowing through the housing 102.

Optionally, the housing 102 can include a one-way valve (e.g., a check valve) at the receiving port 228 or between the receiving port 228 and the water passage 229. This can help enable the dosing system 100 to permit water to flow from the water source to the water heater 10 even when a cartridge 110 is not present (i.e., when a cartridge is not connected to the housing 102). In addition, the cartridge 110 can be removed and/or connected without stopping water from flowing through the housing 102. Further, the dosing system 100 can be configured such that, in the event of a power outage, the motor 222 does not run and no additive is added to the water.

As will be appreciated, the flexible tube 214 in a peristaltic pump is often considered a consumable component of the peristaltic parts that requires regular inspection and replacement. This is because as the rotors continue to pinch the flexible tube 214, the flexible tube 214 can wear and eventual rupture. Thus, the disclosed designs, such as those illustrated by FIGS. 2A and 2B, provide a system in which the flexible tube 214 can be easily replaced when a new supply of additive is provided because the flexible tube can be included as a component of the cartridge itself 110.

Figure 3:
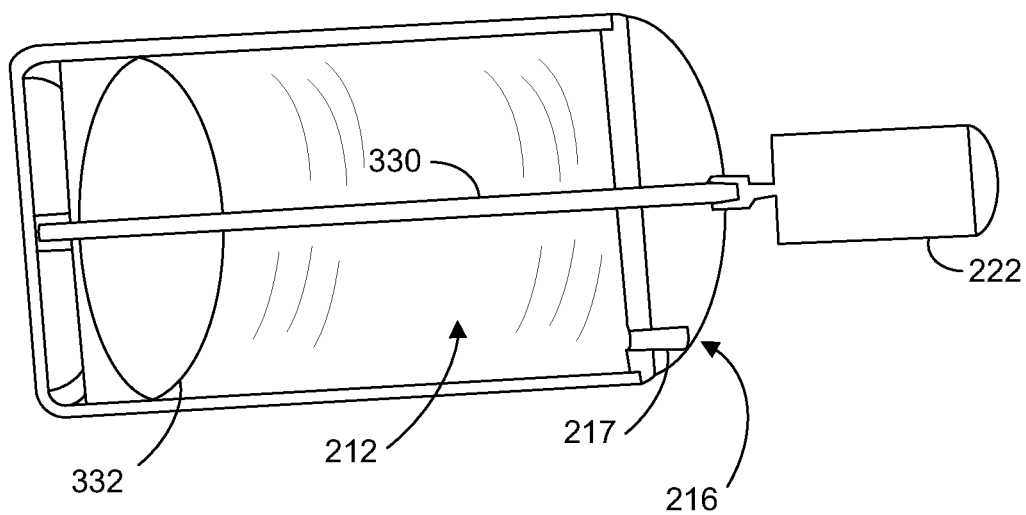
FIG. 3 illustrates a cross-sectional schematic view of an example screw dosing system, in accordance with the disclosed technology.

Alternatively, the motor 222 can be a part of or be in communication with a syringe pump system or a screw dosing system, such as the example screw dosing system illustrated in FIG. 3. In such a system, the cartridge 110 can include a shaft or screw 330 (e.g., extending through the reservoir 212; extending through a centrally located passage that is fluidly separated from the reservoir 212), and a plunger 332 can be attached to the screw 330 such that, as the screw 330 rotates, the plunger 332 moves laterally through the reservoir 212. When the cartridge 110 is connected to the housing 102, the screw 330 can be placed in mechanical communication with the motor 222 (which can be located in the housing 102) such that the motor 222 can rotate the screw 330. As the motor 222 rotates the screw 330, the plunger 332 is moved toward the end of the cartridge 110 proximate the housing 102. This movement of the plunger 332 can displace additive located in the reservoir 212, forcing an amount of additive out of the outlet 216 and/or check valve 217. When the cartridge 110 is connected to the housing 102, the outlet 216 and/or check valve 217 can be in fluid communication with the receiving port 228, thereby dispensing a precise amount of additive from the cartridge 110 and to the water flowing through the housing 102.

Alternatively, the dosing system 100 can include a diaphragm pump system, such as the example diaphragm pump systems illustrated in FIGS. 4A and 4B. At least a portion of the diaphragm pump 400 can be located within the housing 102. For example a pump shaft 410 can be located in the housing 102, and a diaphragm membrane 412 can be located proximate an end of the cartridge 110. Alternatively, the pump shaft 410 and the diaphragm membrane 412 can be located in the cartridge 110. Regardless, the diaphragm membrane 412 can be flexible and/or elastic. When the cartridge 110 is connected to the housing 102, the reservoir 212 of the cartridge can be fluidly connected to the receiving port 228, and the receiving port 228 can be connected to a pump cavity 414. The diaphragm membrane 412 can be attached to at least a portion of the pump cavity 414. A first one-way valve 416 can be located between reservoir 212 of the cartridge 110 and the pump cavity 414 of the housing 102 (i.e., downstream of the reservoir 212 and upstream of the pump cavity). The first one-way valve 416 can be located in the cartridge 110 or in the housing 102. A second one-way valve 418 can be located in the housing 102 between the pump cavity 414 and the water passage 229 (i.e., downstream of the pump cavity and upstream of the water passage 229). When the pump shaft 410 moves away from the pump cavity via the motor 222 (e.g., as illustrated in FIG. 4A), the pump membrane 412 is drawn away from the pump cavity 414, drawing additive from the reservoir 212 of the cartridge 110, through the first one-way valve 416, and into the pump cavity 414. The pump shaft 410 can then be moved toward the pump cavity 414 by the motor 222 (e.g., as illustrated in FIG. 4B), which moves the diaphragm membrane 412 toward the pump cavity 414, pushing the additive from the pump cavity 414, through the second one-way valve 418, and into the water passage 229. Alternatively, the diaphragm pump system 400 can be a piston-type pump system, which can operate similarly as described immediately above, except that a flexible diaphragm membrane is not used. That is, such piston-type systems can include only a piston (e.g., the shaft 410) to pull and push water through the diaphragm pump system 400. The diaphragm pump system 400 can include a piezoelectric motor, an electrical magnet, a motor/cam assembly, or the like to move the diaphragm membrane.

Alternatively, the diaphragm membrane and the pump cavity can be included in the cartridge 110. This can help facilitate easy replacement of the diaphragm membrane when the cartridge is replaced, because the diaphragm membrane can become worn similar to the flexible tube 214 of the peristatic pump system, as described herein.

Optionally, the cartridge 110 can include a display 215 configured to display a status of the cartridge 110. For example, the display 215 can display the amount of additive remaining in the reservoir 212 (e.g., based on data from one or more sensors located in or proximate the reservoir). The display 215 can include a display screen, one or more LEDs (e.g., color coded lights), or the like. The display 215 can communicate with the controller 220 via the electrical contacts 226, for example. Alternatively or additionally, the display 215 can be located on the housing 102. Alternatively or additionally, the cartridge 110 or the housing 102 can include a speaker configured to emit an audible alarm indicating that the amount of additive in the reservoir 212 has fallen below a predetermined threshold amount. Alternatively or additionally, the controller 220 can be in electrical communication with a transceiver and can be configured to communicate with a user's computing device directly or via a network (e.g., via the cloud). For example, the controller 220 can be configured to transmit a message to the user's computing device indicating that the cartridge 110 needs replaced soon, is out of additive, or the like.

As another option, the dosing system 100 can include one or more sensors 232 configured to detect a concentration of additive in the water (e.g., an amount of phosphate added to the water). The sensor(s) 232 can be in electrical communication with the controller 220. For example, the sensor(s) 232 can include a sodium hexametaphosphate selective electrode, a total dissolved solids (TDS) conductivity probe, or the like.

In a dual sensor configuration, such as the one illustrated in FIG. 2A, the sensors 232 can be TDS probes, and the water running into the system can be tested for TDS at a first location upstream of the location at which the additive is added to the water and at a second location downstream of the location at which the additive is added to the water. The difference between these two measurements can be indicative of the amount of additive added to the water.

In a single sensor configuration, a single sensor 232 can be a sodium hexametaphosphate selective electrode (e.g., as disclosed in US 2020/0158682, the entire contents of which are incorporated herein by reference) and can be installed at a location upstream of the location at which the additive is added to the water.

Alternatively or additionally, a single sensor 232 can be a TDS probe configured to measure electrical conductivity and can be installed at a location upstream of the location at which the additive is added to the water. The TDS probe can be accurate to within approximately 3% (i.e., ±approximately 3%) to detect the amount of sodium hexametaphosphate in moderately hard water regions For added benefit in high hard water regions, which may have up to and including 400 ppm of TDS, the TDS probe can be accurate to within approximately 1% (i.e., ±approximately 1%) to detect the amount of sodium hexametaphosphate. As an example, the controller 220 can be programmed to first calibrate, measuring the TDS of a given volume of untreated water flowing through the system. For an area such as Rock Rapids Iowa, the initial TDS calibration reading may read 380-400 ppm. As the dosing system 100 begins to operate, the TDS is measured, and the amount of additive added (e.g., approximately 5 ppm) can be monitored by the sensor 232. If the concentration of additive exceeds a predetermined threshold (e.g., a predetermined amount, such as approximately 11 ppm, above the calibration amount), the controller 220 system can stop adding the additive until the concentration of additive falls below the predetermined threshold. When the additive concentration is above the predetermined threshold, the dosing system 100 can output an error indication at the display 215, to the user's computing device, or the like. To help reduce the likelihood of unreliable data or false positives (e.g., where water supply is variable in conductivity), the controller 220 can be configured to conduct periodic (e.g., once every predetermined duration) system recalibrations.

Figure 5B:
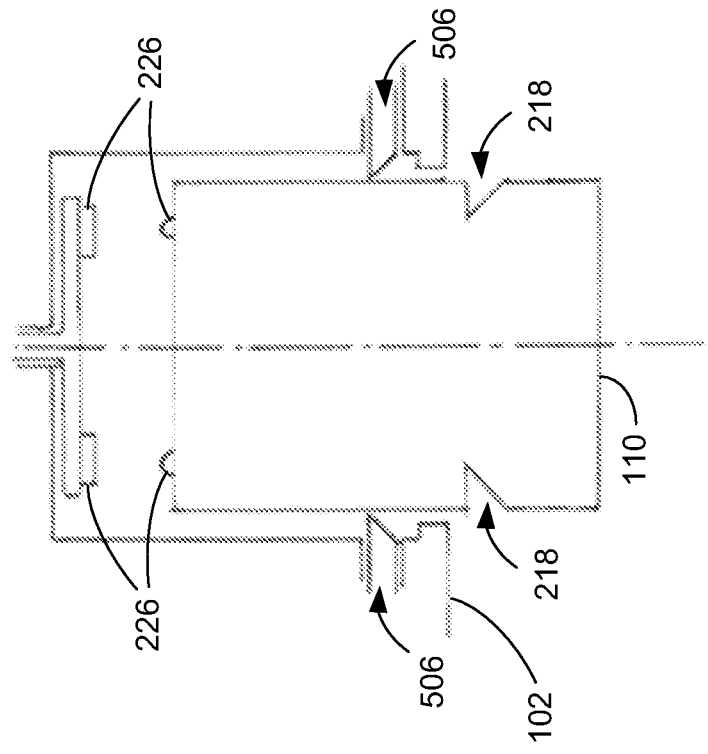
FIGS. 5A-5C illustrate example attachment mechanisms for connecting portions of a dosing system, in accordance with the disclosed technology.
Figure 5A:
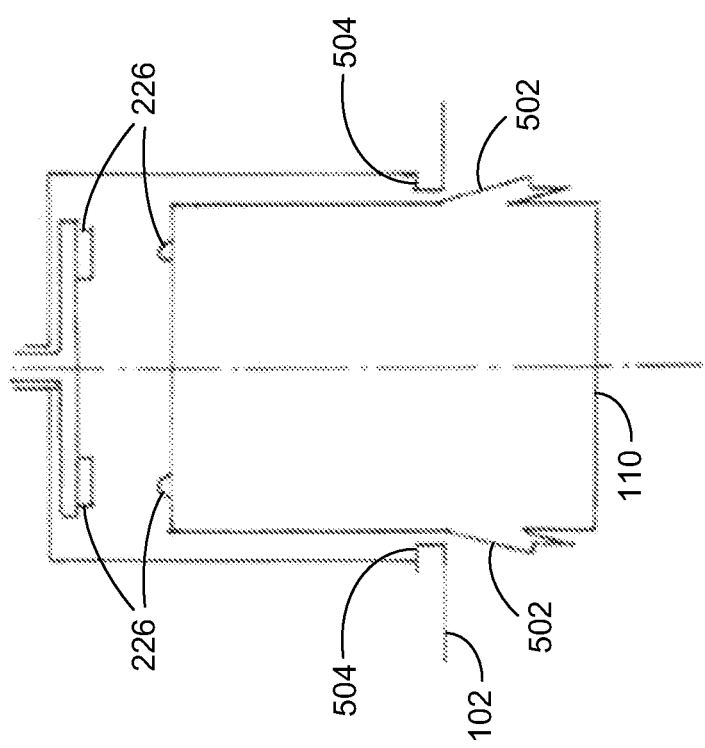
Figure 5C:
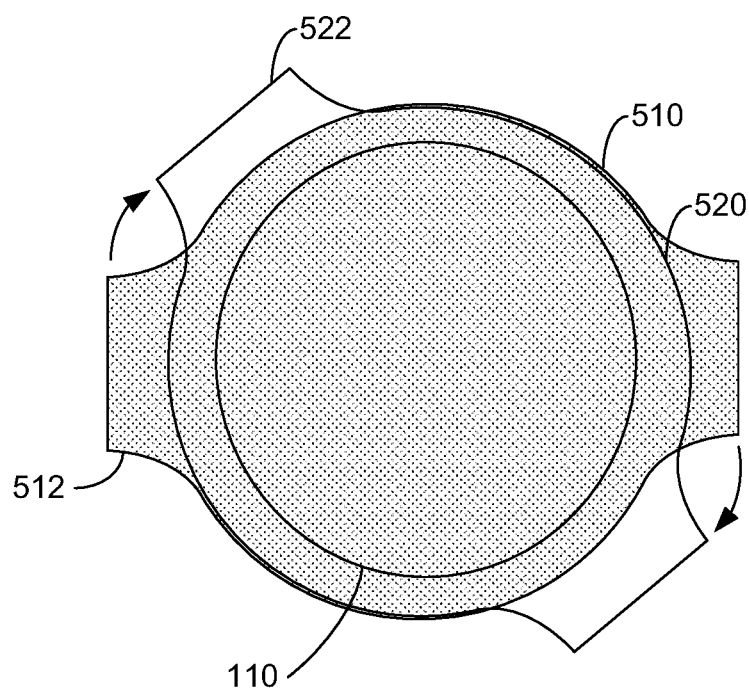
Figure 6:
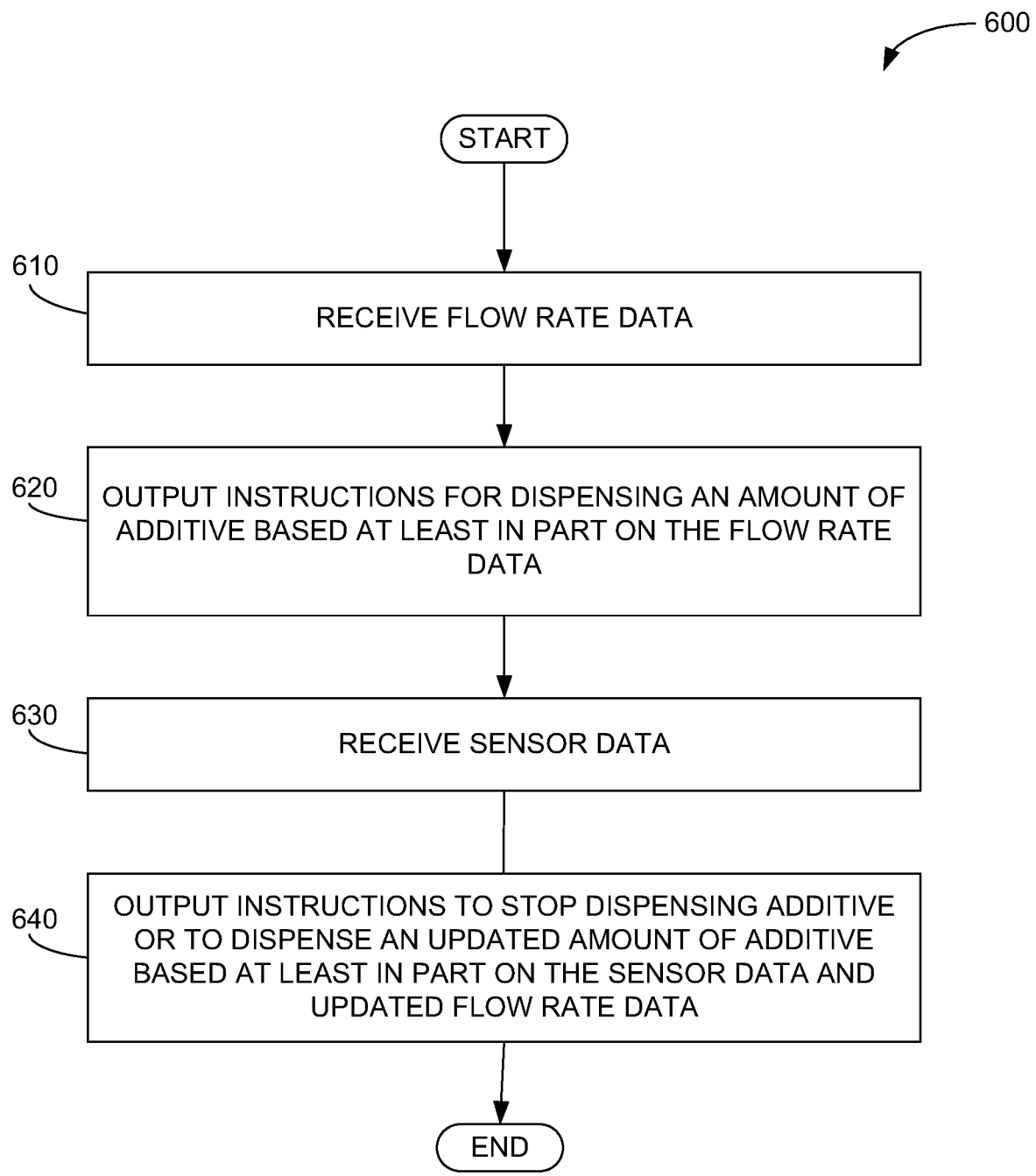
FIG. 6 illustrates a flowchart of an example method for controlling a dosing system, in accordance with the disclosed technology.

FIGS. 5A-5C detail example mechanical connector systems for attaching the cartridge 110 to the housing 102. FIG. 5A depicts an example "push home, and pinch to remove" type lock mechanism. The cartridge 110 can include one or more spring locks 502 including an edge or face configured to abut an edge or protrusion 504 of the housing 102, thereby locking the cartridge 110 in connection to the housing 102 until the spring lock 502 is pressed to remove the edge or face of the spring lock 502 from contact with the edge or protrusion of the housing 102.

Alternatively, FIG. 5B depicts a piston-type lock mechanism that can be electronically actuated to retain or release the cartridge 110. To lock the cartridge in contact with the housing 102, one or more pistons 506 can extend radially inwardly toward the cartridge 110 and can be at least partially received by detents 218 in the cartridge 110. To unlock the cartridge 110, the piston(s) 506 can be drawn radially outwardly from the cartridge 110, thereby removing the piston(s) 506 from the detent(s) 218.

Alternatively, FIG. 5C depicts a bayonet-lock connector. The housing 102 can include a receiving channel 510 configured to receive a protrusion 520 of the cartridge 110. In FIG. 5C, the cartridge 110 and protrusion 520 are shown as transparent for clarity of illustration. The receiving channel 510 and the protrusion 520 can have an approximately equal size and/or shape, and the receiving channel 510 and the protrusion 520 can each have one or more projections 512, 522. To attach the cartridge 110 to the housing 102, the projection 522 of the cartridge 110 can be aligned with the projection 512 of the housing 102, and the protrusion 520 of the cartridge 110 can be inserted into the receiving channel 510 of the housing 102. The cartridge 110 can then be rotated, causing the projection 522 of the cartridge to become unaligned with the projection 512 of the housing 102 and rotating the projection 522 of the cartridge inside the receiving channel 510 (i.e., under a lip of the housing 102). Optionally, a spring can be located at the bottom of the receiving channel 510 such that, when the cartridge 110 is inserted into the receiving channel 510, the spring must be compressed to rotate the protrusion 520 within the receiving channel 510. The spring can then press the projection 522 of the cartridge 110 against the lip of the housing 102, securing the cartridge 110 in place. To remove the cartridge 110, the cartridge 110 can again be pressed to compress the spring, and the cartridge 110 can be rotated until the projection 522 of the cartridge 110 aligns with the projection of the receiving channel 510 such that the cartridge 110 can be removed from the housing 102. Additionally, the force imparted by the spring can be sufficient to cause the rotors of the rotor system 223 to impinge the flexible tube 214 (if present) and/or engage the outlet 216 and/or check valve 217 with the receiving port 228.

The attachment mechanism used to connect the cartridge 110 to the housing 102 can provide feedback (e.g. visual, audible, haptic) to indicate the cartridge 110 is fully attached or connected to the housing 102. Alternately or additionally, the controller 220 can be configured to display and/or transmit a message indicating whether the cartridge 110 is correctly installed and/or securely locked into place.

Optionally, the controller 220 can be configured to monitor historical use data of the dosing system 100. For example, the controller 220 can be configured to detect and monitor when a cartridge is installed, when a cartridge is not installed, when the water heater is running with an empty cartridge 110, and the like. The controller 220 can be configured to transmit this data to a backend server associated with the manufacturer of the water heater 10 or another entity such that the historical data can be used for making warranty determinations (e.g., the warranty for the water heater 10 can require a the dosing system 100 to include a non-empty cartridge 110 for at least a threshold percentage of the water heater's 10 installed life in order for the warranty to apply).

As another option, the cartridge 110 can include an electronic tag or other identifier to identify the particular cartridge, batch of additive, and the like. The controller 220 can be configured to associated historical use information with respective identifiers associated with the corresponding cartridge(s) 110. The controller 220 can optionally be configured to cross-reference the identifier with a backend system to ensure the cartridge 110 was manufactured by an approved manufacturer, which can help ensure the cartridge 110 is compatible with the dosing system 100 and will not damage the dosing system 100, the water heater 10, or other systems.

As explained herein, certain portions of the pump system can be included in the cartridge 110. The portions of the pump system included in the cartridge 110 can be the components of the pump system that are most prone to wear and degradation from time and/or use. Accordingly, the dosing system 100 can facilitate easy replacement of such components upon replacement of the cartridge 110 (e.g., when the cartridge 110 runs out of additive). To that end, the reservoir 212 of the cartridge 110 can be dimensioned such that the cartridge 110 will need to be replaced approximately the same time (or before) the expiration of the expected usable life of certain components of the pump system. Moreover, the dosing systems 100 described herein are configured to deliver precise, small amounts of additive to a desired or predetermined dilution (e.g., approximately 5 ppm) regardless of water pressure and flow rate. The dosing systems 100 can be configured to deliver the desired or predetermined dilution of additive regardless of the hardness of the water flowing through the dosing system 100. Thus, the disclosed dosing systems 100 can be useable across a number of municipalities, altitudes, and other location-based factors.

Referring now to FIG. 5, the disclosed technology includes a method 600 for controlling a dosing system (e.g., dosing system 100). That is to say, the method 600 can be performed in full or in part by a controller (e.g., controller 220) or some other type of processing circuitry. The method 600 can include receiving 610 flow rate data from a flow rate sensor (e.g., flow meter 224), and the method 600 can include outputting 620 instructions for the dispensing of a predetermined amount of additive based at least in part on the flow rate data. For example, the method 600 can include determining that the flow rate data is indicative of a flow of water starting, and in response to determining the flow of water has begun, outputting instructions for the dispensing system (e.g., motor 222) to output a predetermined amount of the additive.

Alternatively or additionally, the method 600 can include determining that the flow rate data is indicative of a flow of water stopping (e.g., determining water has begun to flow and subsequently has stopped flowing, determining water has begun to flow and subsequently determining that the flow rate has dropped below a predetermined flow rate threshold), and in response to determining that the flow of water is stopping (or slowing down), outputting instructions for the dispensing system to output a predetermined amount of the additive. In such a configuration, the method 600 can provide intermittent dosing to a water heater when the water heater is off or in standby mode (e.g., when there is not an active demand for heated water). This can help ensure that the additive is included in the water that is surrounding the heating elements of the water heater while the water heater is off or in standby mode. This can help reduce or minimize the amount of additive used to reduce or prevent scaling in the water heater. In turn, this can extend the useful life of the cartridge of the dosing system and can reduce or minimize the amount of additive added to potable water.

The method 600 can include receiving 630 sensor data from one or more sensors (e.g., sensor(s) 232). If the sensor data indicates that the concentration of additive is greater than or equal to a predetermined threshold, the method 600 can include outputting 640 instructions to stop dispensing additive, which can permit the concentration of additive to decrease upon further flow of water through the dosing system and/or water heater. The method 600 can include receiving updated sensor data, and in response to the concentration of additive being less than the predetermined threshold, outputting instructions to output the additive.

Alternatively or additionally, in response to receiving 630 sensor data indicating that the concentration of additive is greater than or equal to the predetermined threshold, the method 600 can include outputting 640 instructions to output an updated amount of additive (e.g., a reduced amount of additive corresponding to a reduced target concentration). The instructions can correspond to outputting the updated amount of additive based at least in part on the sensor data as described above.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "one example," "an example," "some examples," "example embodiment," "various examples," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Further, certain methods and processes are described herein. It is contemplated that the disclosed methods and processes can include, but do not necessarily include, all steps discussed herein. That is, methods and processes in accordance with the disclosed technology can include some of the disclosed while omitting others. Moreover, methods and processes in accordance with the disclosed technology can include other steps not expressly described herein.

Throughout the specification and the claims, the following terms take at least the meanings explicitly associated herein, unless otherwise indicated. The term "or" is intended to mean an inclusive "or." Further, the terms "a," "an," and "the" are intended to mean one or more unless specified otherwise or clear from the context to be directed to a singular form. By "comprising," "containing," or "including" it is meant that at least the named element, or method step is present in article or method, but does not exclude the presence of other elements or method steps, even if the other such elements or method steps have the same function as what is named.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain examples of this disclosure have been described in connection with what is presently considered to be the most practical and various examples, it is to be understood that this disclosure is not to be limited to the disclosed examples, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain examples of the technology and also to enable any person skilled in the art to practice certain examples of this technology, including making and using any apparatuses or systems and performing any incorporated methods. The patentable scope of certain examples of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A liquid dosing system comprising:
    a cartridge comprising:
        a reservoir configured to store an additive;
        an additive output vessel in fluid communication with the reservoir; and
        a cartridge outlet in fluid communication with the additive output vessel; and
    a housing comprising:
        a water passage in fluid communication with an inlet of the housing and an outlet of the housing;
        a receiving portion configured to at least partially receive the cartridge when the cartridge is connected to the housing, the receiving portion comprising:
            a receiving port in fluid communication with the water passage, the receiving port configured to receive at least some of the additive from the cartridge outlet when the cartridge is connected to the housing; and
            a motor configured to engage in mechanical communication with the additive output vessel when the cartridge is connected to the housing;
        a flow meter configured to measure a flow rate and output flow rate data indicative of the flow rate; and
        a controller in electrical communication with the flow meter and the motor, the controller configured to:
            receive the flow rate data from the flow meter; and
            output, based at least in part on the flow rate data, instructions for the motor to output a predetermined amount of the additive for mixing with water flowing through the water passage,
            wherein the controller is configured to output the instructions for the motor in response to determining, based on the flow rate data, that the water has stopped flowing through the water passage.

2. The liquid dosing system of claim 1, wherein the additive output vessel is a flexible tube.

3. The liquid dosing system of claim 2, wherein the housing further comprises a peristaltic pump comprising:
    the motor; and
    a rotor system in mechanical communication with the motor, the rotor system configured to at least partially impinge the flexible tube when the cartridge is connected to the housing.

4. The liquid dosing system of claim 1, wherein the reservoir is the additive output vessel, the cartridge further comprising:
    a screw; and
    a plunger (i) disposed within the reservoir, (ii) connected to the screw, and (iii) configured to move laterally within the reservoir when the screw turns.

5. The liquid dosing system of claim 4, wherein the screw is configured to mechanically communicate with the motor when the cartridge is connected to the housing.

6. The liquid dosing system of claim 1, wherein the motor comprises at least one of a stepper motor, a continuous motor with a gear reducer, and a variable frequency drive direct drive motor.

7. The liquid dosing system of claim 1, wherein the cartridge further comprises a check valve configured to permit the additive to flow out of the cartridge and to prevent fluids from flowing into the cartridge.

8. The liquid dosing system of claim 1 further comprising a latching system configured to detachably attach the cartridge to the housing.

9. The liquid dosing system of claim 1, wherein the controller is configured to output the instructions for the motor in response to determining, based on the flow rate data, that a flow rate of the water flowing through the water passage is less than a predetermined flow rate threshold.

10. The liquid dosing system of claim 1, wherein the additive comprises at least one of sodium hexametaphosphate and sodium polyphosphate.

11. The liquid dosing system of claim 10, wherein the predetermined amount of the additive corresponds to between approximately 1 part per million (ppm) and 10 ppm of the additive in the water.

12. The liquid dosing system of claim 10, wherein the predetermined amount of the additive corresponds to between approximately 0.020 mL and approximately 0.040 mL of additive per gallon of the water flowing through the water passage.

13. The liquid dosing system of claim 1, wherein at least one of the cartridge and the housing includes a user interface in electrical communication with the controller, the user interface being configured to indicate a status of the cartridge.

14. A liquid dosing system comprising:
a cartridge comprising:
a reservoir configured to store an additive;
a pump cavity in fluid communication with the reservoir;
a cartridge outlet in fluid communication with the pump cavity; and
a diaphragm membrane attached to at least a portion of the pump cavity; and
a housing comprising:
a water passage in fluid communication with an inlet of the housing and an outlet of the housing;
a receiving portion configured to at least partially receive the cartridge when the cartridge is connected to the housing, the receiving portion comprising:
a receiving port in fluid communication with the water passage, the receiving port configured to receive at least some of the additive from the cartridge outlet when the cartridge is connected to the housing; and
a motor configured to engage in mechanical communication with the diaphragm membrane when the cartridge is connected to the housing;
a flow meter configured to measure a flow rate and output flow rate data indicative of the flow rate; and
a controller in electrical communication with the flow meter and the motor, the controller configured to:
receive flow rate data from the flow meter; and
output, based at least in part on the flow rate data, instructions for the motor to output a predetermined amount of the additive for mixing with water flowing through the water passage,
wherein the controller is configured to output the instructions for the motor in response to determining, based on the flow rate data, that the water has stopped flowing through the water passage.

15. The liquid dosing system of claim 14, wherein the diaphragm membrane is elastic.

16. The liquid dosing system of claim 14 further comprising:
a first one-way valve located downstream of the reservoir and upstream of the pump cavity, the first one-way valve being configured to permit the additive to flow out of the reservoir and to prevent fluids from flowing into the reservoir; and
a second one-way valve located downstream of the pump cavity and upstream of the water passage, the second one-way valve being configured to permit the additive to flow out of the pump cavity and to prevent the fluids from flowing into the pump cavity.

17. The liquid dosing system of claim 14, wherein the cartridge is detachably attachable to the housing.

18. The liquid dosing system of claim 17 further comprising a latching system configured to detachably attach the cartridge to the housing.

19. A liquid dosing system comprising:
a cartridge comprising:
a reservoir configured to store an additive, wherein the additive comprises at least one of sodium hexametaphosphate and sodium polyphosphate;
an additive output vessel in fluid communication with the reservoir; and
a cartridge outlet in fluid communication with the additive output vessel; and
a housing comprising:
a water passage in fluid communication with an inlet of the housing and an outlet of the housing;
a receiving portion configured to at least partially receive the cartridge when the cartridge is connected to the housing, the receiving portion comprising:
a receiving port in fluid communication with the water passage, the receiving port configured to receive at least some of the additive from the cartridge outlet when the cartridge is connected to the housing; and
a motor configured to engage in mechanical communication with the additive output vessel when the cartridge is connected to the housing;
a flow meter configured to measure a flow rate and output flow rate data indicative of the flow rate; and
a controller in electrical communication with the flow meter and the motor, the controller configured to:
receive the flow rate data from the flow meter; and
output, based at least in part on the flow rate data, instructions for the motor to output a predetermined amount of the additive for mixing with water flowing through the water passage,
wherein the predetermined amount of the additive corresponds to between approximately 1 part per million (ppm) and 10 ppm of the additive in the water.

* * * * *